(12) United States Patent
Fujikawa et al.

(10) Patent No.: US 10,541,397 B2
(45) Date of Patent: Jan. 21, 2020

(54) BATTERY

(71) Applicant: SANYO Electric Co., Ltd., Daito-shi, Osaka (JP)

(72) Inventors: Masato Fujikawa, Osaka (JP); Tomohiko Yokoyama, Osaka (JP); Keisuke Shimizu, Osaka (JP); Takeshi Enomoto, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 287 days.

(21) Appl. No.: 15/521,022

(22) PCT Filed: Sep. 17, 2015

(86) PCT No.: PCT/JP2015/004754
§ 371 (c)(1),
(2) Date: Apr. 21, 2017

(87) PCT Pub. No.: WO2016/067510
PCT Pub. Date: May 6, 2016

(65) Prior Publication Data
US 2017/0317326 A1   Nov. 2, 2017

(30) Foreign Application Priority Data
Oct. 31, 2014   (JP) .................. 2014-222714

(51) Int. Cl.
*H01M 2/12* (2006.01)
*H01M 2/34* (2006.01)
*H01M 2/04* (2006.01)

(52) U.S. Cl.
CPC .......... *H01M 2/1241* (2013.01); *H01M 2/345* (2013.01); *H01M 2/046* (2013.01); *H01M 2/0413* (2013.01); *H01M 2200/20* (2013.01)

(58) Field of Classification Search
CPC .......... H01M 2200/20; H01M 2/0413; H01M 2/046; H01M 2/1241; H01M 2/345
See application file for complete search history.

(56) References Cited

U.S. PATENT DOCUMENTS 8,974,931 B2    3/2015   Kim
2011/0008654 A1  1/2011   Kim et al.
(Continued)

FOREIGN PATENT DOCUMENTS

CN    103579535 A    2/2014
CN    103931042 A    7/2014
(Continued)

OTHER PUBLICATIONS

International Search Report dated Dec. 22, 2015, issued in counterpart International Application No. PCT/JP2015/004754 (2 pages).
(Continued)

*Primary Examiner* — Lingwen R Zeng
(74) *Attorney, Agent, or Firm* — Westerman, Hattori, Daniels & Adrian, LLP

(57) ABSTRACT

A battery includes a bottomed cylindrical case body that accommodates an electrode body and a bottom-portion insulating plate (19) that is disposed between the electrode body and a bottom portion of the case body. The bottom portion of the case body has a gas discharge port that opens when an internal pressure of the battery reaches a predetermined pressure. The bottom-portion insulating plate (19) has a through hole. An aperture ratio, which is a ratio of an area of the through hole with respect to a total area of the insulating plate, is greater than or equal to 10% and less than or equal to 40%. A Young's modulus of the bottom-portion insulating plate at 25° C. is 10 GPa or greater.

5 Claims, 5 Drawing Sheets

(56) References Cited

U.S. PATENT DOCUMENTS

| | | | |
|---|---|---|---|
| 2012/0196163 A1* | 8/2012 | Shimizu | H01M 2/12 429/57 |
| 2014/0045000 A1 | 2/2014 | Kim | |
| 2015/0010793 A1 | 1/2015 | Yokoyama et al. | |

FOREIGN PATENT DOCUMENTS

| | | |
|---|---|---|
| JP | 10-340712 A | 12/1998 |
| JP | 2007-188711 A | 7/2007 |
| JP | 2012-506107 A | 3/2012 |
| JP | 2014-36014 A | 2/2014 |
| JP | 2014-72050 A | 4/2014 |

OTHER PUBLICATIONS

English Translation of Search Report dated Feb. 27, 2019, issued in counterpart CN Application No. 1 201580058966.3 (2 pages).

* cited by examiner

BATTERY

TECHNICAL FIELD

The present disclosure relates to a battery having a gas discharge port (an exhaust valve) that opens when an internal pressure reaches a predetermined pressure.

BACKGROUND ART

In order to prevent, for example, rupture of a battery case when the internal pressure of the battery rises due to the generation of heat by, for example, an internal short circuit, a known battery having a gas discharge port in a sealing body or in a bottom portion of the battery case is provided (see, for example, Patent Literature 1). According to Patent Literature 1, in order to stably discharge gas during thermal runaway, an electrode-body-side surface of an insulating plate that is disposed between the electrode body and the gas discharge port is provided with a protruding portion, and a particular cyclic ether compound is added to a nonaqueous electrolyte.

CITATION LIST

Patent Literature

PTL 1: Japanese Published Unexamined Patent Application No. 2014-072050

SUMMARY OF INVENTION

Technical Problem

A gas discharge path of a gas discharge port in the bottom portion of the battery case is short and simple compared to a gas discharge mechanism of the sealing body. Therefore, it is possible to efficiently discharge gas. However, when the discharge of gas causes the electrode body to move and block the discharge port, smooth discharge of gas may be hindered.

Solution to Problem

An embodiment according to the present disclosure provides a battery including a bottomed cylindrical case body that accommodates an electrode body and a bottom-portion insulating plate that is disposed between the electrode body and a bottom portion of the case body, wherein the bottom portion of the case body has a gas discharge port that opens when an internal pressure of the battery reaches a predetermined pressure; the bottom-portion insulating plate has a through hole; an aperture ratio, which is a ratio of an area of the through hole with respect to a total area of the insulating plate, is greater than or equal to 10% and less than or equal to 40%; and a Young's modulus of the bottom-portion insulating plate at 25° C. is 10 GPa or greater.

Advantageous Effects of Invention

The battery according to an embodiment of the present disclosure makes it possible to, when gas that is generated in the battery is discharged to the outside, suppress blocking of the gas discharge port by the electrode body and smoothly discharge the gas.

DESCRIPTION OF EMBODIMENTS

An embodiment is hereunder described in detail with reference to the drawings.

The figures that are referred to in the embodiment are schematically drawn. For example, dimension ratios of structural elements shown in the figures may differ from those of actual structural elements. For example, specific dimension ratios should be determined considering the following descriptions.

Figure 1:
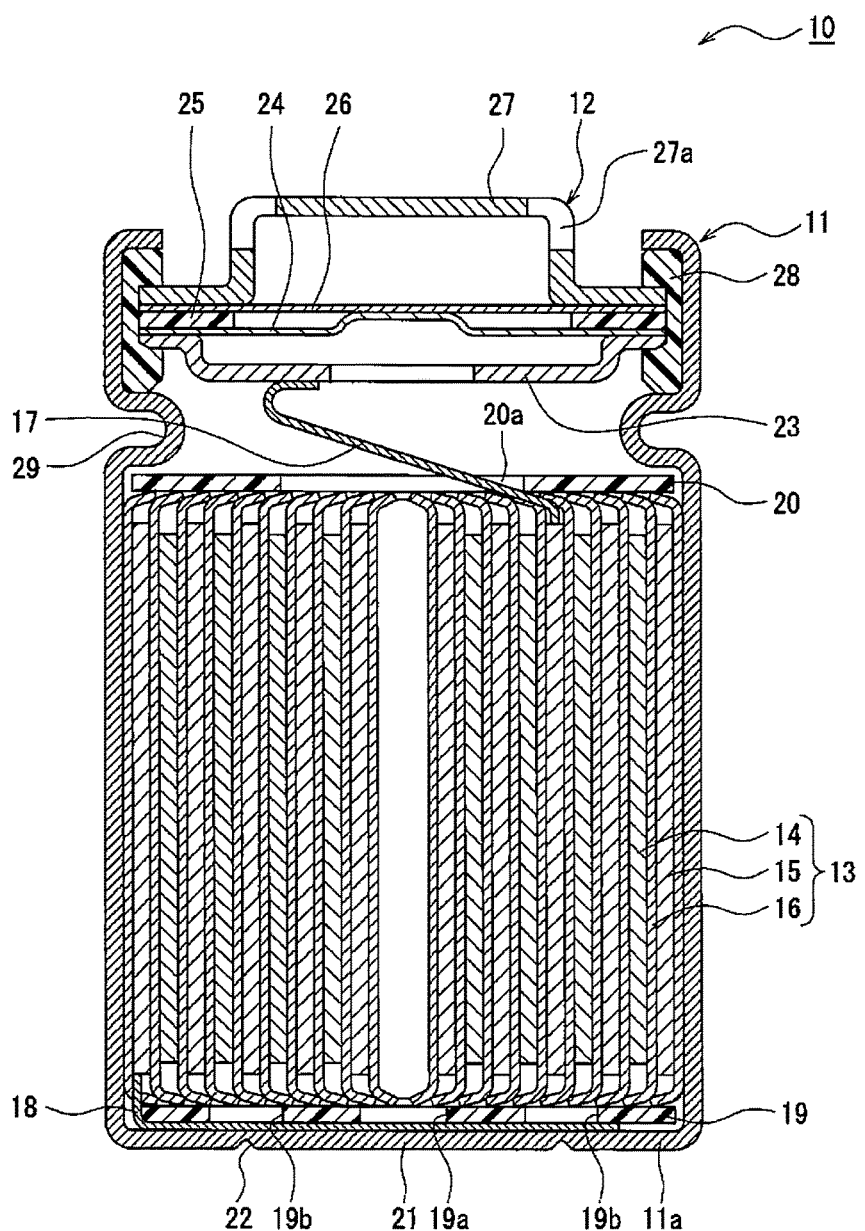
FIG. 1 is a sectional view of a battery according to an embodiment.

FIG. 1 is a sectional view of a battery 10 according to an embodiment.

The battery 10 includes a bottomed cylindrical case body 11 and a sealing body 12. The case body 11 accommodates an electrode body 13. The sealing body 12 covers an opening in the case body 11. The case body 11 and the sealing body 12 constitute a battery case that seals an internal portion of the battery. A bottom portion 11a of the case body 11 has a gas discharge port 21 that opens when the internal pressure of the battery reaches a predetermined pressure. In the embodiment shown in FIG. 1, the sealing body 12 also has a gas discharge mechanism.

The electrode body 13 has, for example, a winding structure formed by winding a positive electrode 14 and a negative electrode 15 via a separator 16. The electrode body 13 includes a positive electrode lead 17 that is mounted on the positive electrode 14 and a negative electrode lead 18 that is mounted on the negative electrode 15. The battery 10 includes a bottom-portion insulating plate 19 that is disposed between the electrode body 13 and the bottom portion 11a of the case body 11 and an upper-portion insulating plate 20 that is disposed between the electrode body 13 and the sealing body 12. That is, the electrode body 13 is sandwiched by two insulating plates from the top and bottom. In the example shown in FIG. 1, the positive electrode lead 17 extends into a through hole 20a in the upper-portion insulating plate 20 and towards the sealing body 12, and the negative electrode lead 18 extends along an outer side of the bottom-portion insulating plate 19 and adjacent to the bottom portion 11a of the case body 11.

The positive electrode 14 includes, for example, a positive electrode current collector, such as a metal foil, and a positive electrode active material layer that is formed on the positive electrode current collector. The positive electrode current collector may be formed from, for example, a metal foil, such as an aluminum foil, that is stable in an electrical potential range of the positive electrode 14, or a film that contains the metal in a surface layer thereof. The positive electrode current collector has the shape of, for example, a long sheet, and has the positive electrode active material layer formed on both surfaces thereof. It is desirable that the positive electrode active material layer contain, in addition to the positive electrode active material, a conductive material and a binding material. The positive electrode active material is, for example, a lithium composite oxide.

The negative electrode 15 includes, for example, a negative electrode current collector, such as a metal foil, and a negative electrode active material layer that is formed on the negative electrode current collector. The negative electrode current collector may be formed from, for example, a metal foil, such as copper or SUS foil, that is stable in an electrical potential range of the negative electrode 15, or a film that contains the metal in a surface layer thereof. The negative electrode current collector has the shape of, for example, a long sheet, and has the negative electrode active material layer formed on both surfaces thereof. It is desirable that the negative electrode active material layer contain, in addition to the negative electrode active material, a binding material. If necessary, the negative electrode active material layer may contain a conductive material. The negative electrode active material is, for example, graphite.

The separator 16 is formed from a porous sheet having ionic permeability and insulating properties. Specific examples of the porous sheet include a microporous thin film, a woven fabric, and a non-woven fabric. Suitable materials of the separator 16 are, for example, olefin-based resin, such as polyethylene and polypropylene, and cellulose. The separator may be a multilayer body including a cellulose fiber layer and a thermoplastic resin fiber layer such as an olefin-based resin layer.

An electrolyte may be, for example, a non-aqueous electrolyte containing a non-aqueous solvent and an electrolyte salt, such as a lithium salt, dissolved in the non-aqueous solvent. The non-aqueous electrolyte is not limited to a liquid electrolyte, and may be a solid electrolyte using, for example, a gel polymer. Examples of the non-aqueous solvent include esters, ethers, nitriles such as acetonitrile, amides such dimethylformamide, and mixed solvents of two or more types of these substances. Such non-aqueous solvents may contain a halogen substitution product in which the hydrogen of such solvents is replaced by a halogen atom, such as fluorine.

The case body 11 may be, for example, a bottomed cylindrical metal container that accommodates the electrode body 13 and the electrolyte. In the embodiment, the negative electrode lead 18 is connected to an inner surface of the bottom portion 11a of the case body 11 by, for example, welding. Accordingly, the case body 11 becomes a negative electrode terminal. The positive electrode lead 17 is connected to a lower surface of a filter 23 of the sealing body 12 by, for example, welding. Accordingly, a cap 27 of the sealing body 12 that is electrically connected to the filter 23 becomes a positive electrode terminal. A gasket 28 is disposed between the case body 11 and the sealing body 12.

It is desirable that the case body 11 include a support 29 on which the sealing body 12 is placed. The support 29 is formed at an upper portion of the case body 11, has a shape in which part of an inner surface of the case body 11 protrudes inward, and supports the sealing body 12 on a top surface of the protruding portion. It is desirable that the support 29 be formed in a ring shape along a peripheral direction of the case body 11. The support 29 is formed by, for example, outwardly pressing a side surface portion of the case body 11.

It is desirable that the sealing body 12 include a plurality of members that are superimposed upon each other. In the embodiment, the sealing body 12 includes the filter 23, a lower valve body 24, an insulating plate 25, an upper valve body 26, and the cap 27, which are superimposed upon each other from bottom to top in this order. Each member of the sealing body 12 has, for example, a disc shape or a ring shape. The lower valve body 24 and the upper valve body 26 each have a thin-walled portion (not shown) that is broken when the internal pressure of the battery rises. The cap 27 is a member that is provided at a topmost (outermost portion) of the sealing body 12, and functions as a positive electrode terminal. The cap 27 has a cap opening 27a.

The members (excluding the insulating plate 25) of the sealing body 12 are electrically connected to each other. More specifically, a peripheral edge portion of the filter 23 and a peripheral edge portion of the lower valve body 24 are joined to each other, and a peripheral edge portion of the upper valve body 26 and a peripheral edge portion of the cap 27 are joined to each other. A central portion of the lower valve body 24 and a central portion of the upper valve body 26 contact each other with the insulating plate 25 being interposed between peripheral edge portions thereof. For example, a portion of the lower valve body 24 near the central portion thereof bulges towards the upper valve body 26 and is in contact with a lower surface of the upper valve body 26. It is desirable that the contact portion between the valve bodies be joined to each other by, for example, welding.

In the embodiment, the gas discharge mechanism of the sealing body 12 includes the lower valve body 24, the upper valve body 26, and the cap 27. When the internal pressure of the battery 10 rises, the thin-walled portion of the lower valve body 24 breaks, as a result of which the upper valve body 26 bulges towards the cap 27 and separates from the lower valve body 24. This causes the lower valve body 24 and the upper valve body 26 to be electrically disconnected from each other. When the internal pressure rises further, the thin-walled portion of the upper valve body 26 breaks, and gas that is generated in the battery is discharged to the outside via the cap opening 27a. The opening area of the cap opening 27a is, for example, 10 mm$^2$ to 25 mm$^2$ (when the battery 10 is an 18650 type).

Figure 2:
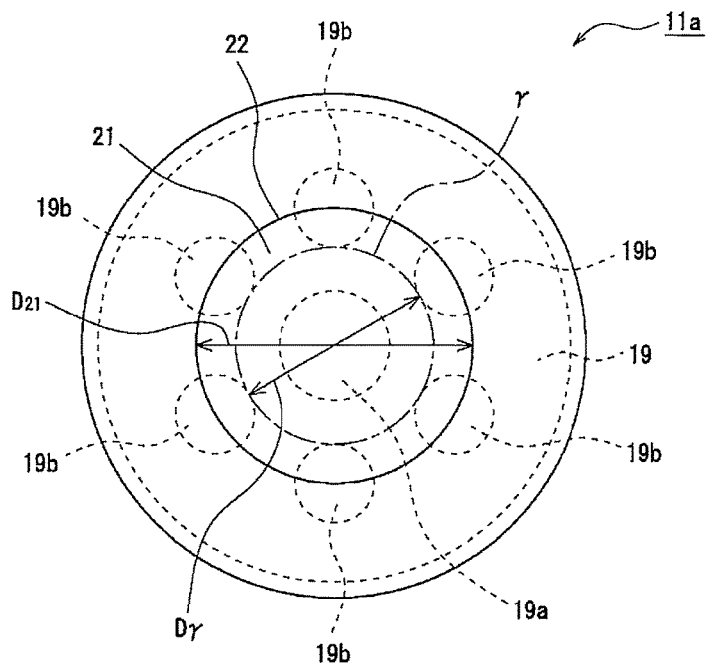
FIG. 2 is a bottom view of the battery shown in FIG. 1.
Figure 3:
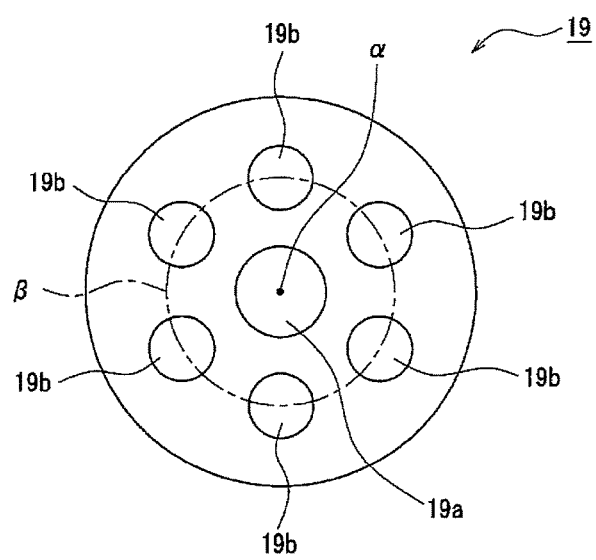
FIG. 3 is a plan view of a bottom-side insulating plate making up the battery shown in FIG. 1.
Figure 4:
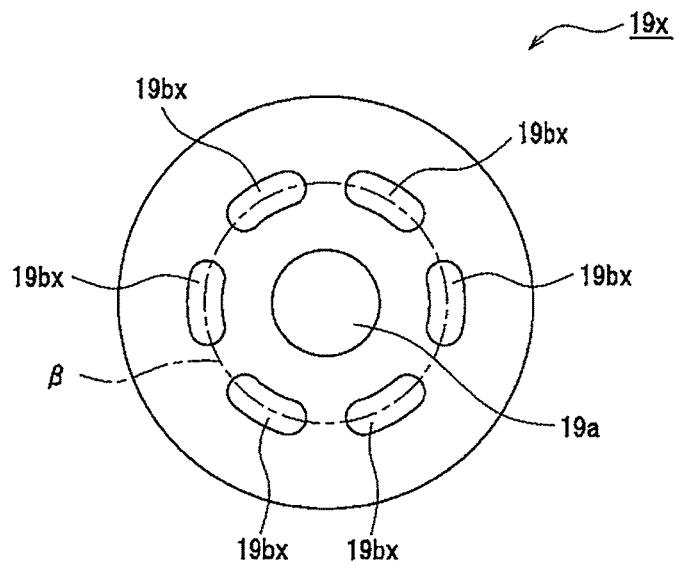
FIG. 4 is a plan view of a bottom-side insulating plate according to another embodiment.
Figure 5:
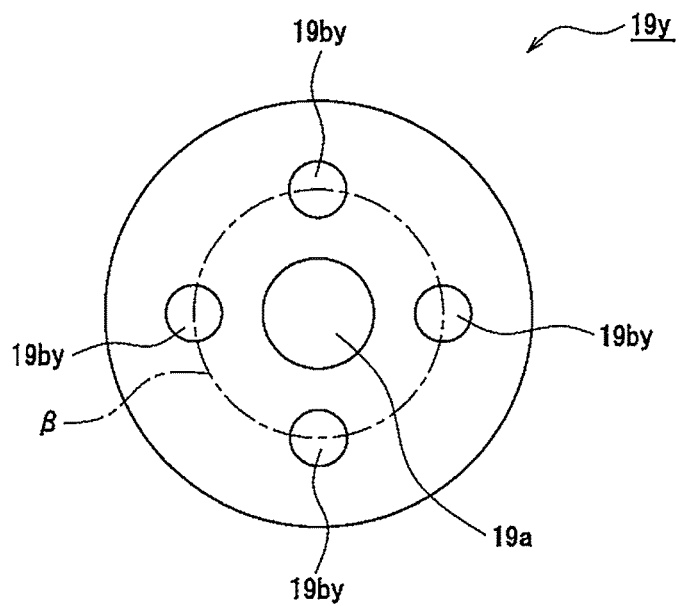
FIG. 5 is a plan view of a bottom-side insulating plate according to still another embodiment.

The structure of the bottom portion 11a of the case body 11 and the structure of the bottom-portion insulating plate 19 are described in detail below with further reference to FIGS. 2 to 5. FIG. 2 is a bottom view of the battery 10. FIG. 3 is a plan view of the bottom-portion insulating plate 19 extracted from FIG. 2. FIGS. 4 and 5 show, respectively, a bottom-portion insulating plate 19x and a bottom-portion insulating plate 19y, which are modifications of the bottom-portion insulating plate 19.

As exemplified in FIG. 2, the bottom portion 11a of the case body 11 has the gas discharge port 21 that opens when the internal pressure of the battery 10 reaches a predetermined pressure. In the embodiment, when the internal pressure of the battery 10 rises (during thermal runaway), gas is discharged by the gas discharge mechanism of the sealing body 12 and is also discharged from the gas discharge port 21. It is desirable that the gas discharge port 21 be designed so as to open at the same time that the gas discharge mechanism of the sealing body 12 starts discharging the gas or earlier than the gas discharge mechanism.

The bottom portion 11a of the case body 11 has, for example, a ring-shaped groove 22, and a portion surrounded by the groove 22 becomes the gas discharge port 21. The groove 22 may have, for example, a C shape in bottom view. However, from the viewpoint of, for example, improving breakability when the internal pressure rises, it is desirable that the groove have a perfect circular shape in bottom view. The groove 22 corresponds to, for example, a carved portion formed from an outer surface side of the bottom portion 11a. Although a plurality of gas discharge ports 21 may be provided, it is desirable that one gas discharge port 21 be provided in the middle of the outer surface of the bottom portion 11*a*.

The area of the gas discharge port 21 (opening area when the gas discharge port 21 is opened) is desirably 20% to 60% of the area of the bottom portion 11*a*, and is more desirably, 25% to 50% of the area of the bottom portion 11*a*. The opening area of the gas discharge port 21 is, for example, 50 mm$^2$ to 80 mm$^2$ (when the battery 10 is an 18650 type), and is desirably greater than the opening area of the gas discharge mechanism of the sealing body 12. It is desirable that the opening area of the gas discharge port 21 be greater than or equal to twice the opening area of the gas discharge mechanism. That is, the battery 10 has a structure that preferentially discharges gas from the bottom portion 11*a* of the case body 11. In the embodiment, the opening area of the cap opening 27*a* of the cap 27 is the opening area of the gas discharge mechanism.

As mentioned above, the bottom-portion insulating plate 19 is disposed between the electrode body 13 and the bottom portion 11*a* of the case body 11 (see FIG. 1), and prevents the positive electrode 14 of the electrode body 13 and the case body 11 from being electrically connected to each other. Further, when gas that is generated in the battery is discharged to the outside from the gas discharge port 21, the bottom-portion insulating plate 19 has the role of suppressing movement of the electrode body 13 without hindering the discharging of the gas. In the embodiment, since the case body 11 has a bottomed-cylinder shape, the bottom-portion insulating plate 19 has a disc shape. The diameter of the bottom-portion insulating plate 19 is, for example, slightly smaller than the diameter of the inner surface of the bottom portion 11*a*.

As exemplified in FIGS. 2 and 3, the bottom-portion insulating plate 19 has a first through hole 19*a* that is formed in a range including a center α of the bottom-portion insulating plate 19 and a plurality of second through holes 19*b* that are formed around the first through hole 19*a*. Although the number of through holes may be one (for example, only the first through hole 19*a*), it is desirable that the number of through holes be more than one.

The aperture ratio of the bottom-portion insulating plate 19 is greater than or equal to 10% and less than or equal to 40%. The Young's modulus of the bottom-portion insulating plate 19 at 25° C. is 10 GPa or greater. The aperture ratio is the ratio of the area of the through holes with respect to the total area of the bottom-portion insulating plate 19 (area including the portions where the through holes are formed). At a temperature of 25° C., the Young's modulus is measured by a compression method (for example, Orientec-made Tensilon universal material testing machine). Unless otherwise particularly indicated, the Young's modulus refers to a value at 25° C. A sample for measuring the Young's modulus may be provided by cutting the bottom-portion insulating plate 19 to a predetermined size, or may be separately provided by using a material that is of the same type as the material making up the bottom-portion insulating plate 19.

The thickness of the bottom-portion insulating plate 19 is desirably greater than or equal to 0.1 mm and less than or equal to 1 mm, and is, more desirably, greater than or equal to 0.1 mm and less than or equal to 0.5 mm. A desirable example of the thickness of the bottom-portion insulating plate 19 is 0.2 mm. The thickness of the upper-portion insulating plate 20 is, for example, about the same as the thickness of the bottom-portion insulating plate 19.

The aperture ratio of the bottom-portion insulating plate 19 is, in terms of the total of the first through hole 19*a* and the second through holes 19*b*, greater than or equal to 10% and less than or equal to 40%. The aperture ratio is desirably greater than or equal to 15% and less than or equal to 35%; and is, more desirably, greater than or equal to 20% and less than or equal to 30%. If the aperture ratio of the bottom-portion insulating plate 19 is in these ranges, it is possible to ensure the strength that allows the movement of the electrode body 13 to be suppressed without hindering the discharging of gas when the gas is discharged from the gas discharge port 21. As the Young's modulus of the bottom-portion insulating plate 19 increases, for example, breakage and excessive deformation of the bottom-portion insulating plate 19 are unlikely to occur when the gas is discharged, as a result of which protrusion of the electrode body 13 is suppressed. The lower limit of the Young's modulus is desirably greater than or equal to 20 GPa; and is, more desirably, greater than or equal to 30 GPa. The upper limit of the Young's modulus is, for example, 200 GPa.

The bottom-portion insulating plate 19 is not particularly limited to certain plates as long as the bottom-portion insulating plate 19 has the aforementioned Young's modulus. However, the bottom-portion insulating plate 19 is desirably made of resin, such as resin having high thermal resistance (for example, epoxy resin, polyimide resin, and phenolic resin); and is, more desirably, made of resin containing reinforcing material such as glass fiber. Although, for example, silica, clay, or mica may be used as the reinforcing material, it is desirable to use, for example, boron fiber, aramid fiber, or glass fiber. A suitable example of the material making up the bottom-portion insulating plate 19 is glass-fiber reinforced phenolic resin (glass phenolic resin) having a Young's modulus of 70 GPa. Glass-fiber reinforced phenolic resin may also be used for the upper-portion insulating plate 20. However, from the viewpoint of, for example, reducing material costs, it is desirable to use polyolefin resin such as polypropylene (having a Young's modulus of 1.5 GPa). That is, the Young's modulus of the bottom-portion insulating plate 19 is greater than the Young's modulus of the upper-portion insulating plate 20.

As exemplified in FIG. 4, the first through hole 19*a* and the second through holes 19*b* may have, for example, the shape of long holes in which each second through hole 19*bx* extends so as to be long in a circumferential direction of an imaginary circle β. However, from the viewpoint of, for example, increasing the strength of the bottom-portion insulating plate 19, it is desirable that the shape be a substantially perfect circle in plan view. In the example shown in FIG. 4, the first through hole 19*a* has the shape of a perfect circle in plan view. The through holes are all described below as having the shape of a perfect circle in plan view as shown in FIG. 3.

As described above, it is desirable that, for example, one first through hole 19*a* be formed in the middle of the bottom-portion insulating plate 19 in the range including the center α (see FIG. 3) of the bottom-portion insulating plate 19. The first through hole 19*a* is a path through which gas flows, and is used as a hole into which a welding rod is inserted when welding the negative electrode lead 18 to the inner surface of the bottom portion 11*a*. In the example shown in FIG. 2, the center of the first through hole 19*a* and the center of the gas discharge port 21 coincide with each other. The area of the first through hole 19*a* is smaller than the area of the gas discharge port 21. The entire first through hole 19*a* is formed within the gas discharge port 21.

Considering the strength of the bottom-portion insulating plate 19, gas permeability, welding operation, etc., it is desirable that the area of the first through hole 19a be greater than or equal to 10% and less than or equal to 45% of the total area of the through holes; and be greater than or equal to 15% and less than or equal to 40% of the total area of the through holes. That is, the area of the second through holes 19b is desirably greater than or equal to 55% and less than or equal to 90% of the total area of the through holes; and is, more desirably, greater than or equal to 60% and less than or equal to 85%.

As mentioned above, a plurality of second through holes 19b are formed around the first through hole 19a. In the example shown in FIG. 3, six second through holes 19b that are smaller than the first through hole 19a are formed. The number of second through holes 19b is not limited to particular numbers, and may be four as exemplified in FIG. 5. The bottom-portion insulating plate 19y shown in FIG. 5 has four second through holes 19by that are disposed at equal intervals on one concentric circle whose center is the first through hole 19a. The first through hole 19a and the plurality of second through holes 19b do not communicate with each other and are disposed apart from each other by a predetermined length. As described later, it is desirable that the length from the center α of the bottom-portion insulating plate 19 to each second through hole 19b be set considering a diameter $D_{21}$ of the gas discharge port 21; and the interval between the first through hole 19a and each second through hole 19b is, for example, 0.5 times to 2.5 times the diameter of each second through hole 19b.

The second through holes 19b may be randomly formed around the first through hole 19a. However, from the viewpoints of, for example, increasing the strength of the bottom-portion insulating plate 19 and improving gas permeability, it is desirable that the second through holes 19b be formed at equal intervals on one concentric circle whose center is the first through hole 19a. In the example shown in FIG. 3, the plurality of second through holes 19b having the same shape and the same size are formed on an imaginary circle β whose center coincides with the center α of the bottom-portion insulating plate 19 (this also applies to the bottom-portion insulating plate 19x and the bottom-portion insulating plate 19y). The interval between the second through holes 19b is, for example, approximately 0.5 to 3 times the size of each second through hole 19b.

A diameter Dγ of an imaginary circle γ, which is a circle whose radius extends from the center α of the bottom-portion insulating plate 19 to inner edges of the second through holes 19b that are closest to the center α, is desirably smaller than the diameter $D_{21}$ of the gas discharge port 21 (see FIG. 2). In the embodiment, the imaginary circle γ extends through the inner edges of all of the second through holes 19b, and the intervals between the inner edges of the respective second through holes 19b and the center α are the same. That is, at least a portion of each second through hole 19b is formed in the gas discharge port 21. More specifically, it is desirable that 30% or more of each second through hole 19b be formed within the gas discharge port 21. As long as a certain distance between each second through hole 19b and the first through hole 19a is ensured and there are no strength-related problems, the entire second through holes 19b may be formed within the gas discharge port 21.

Figure 6:
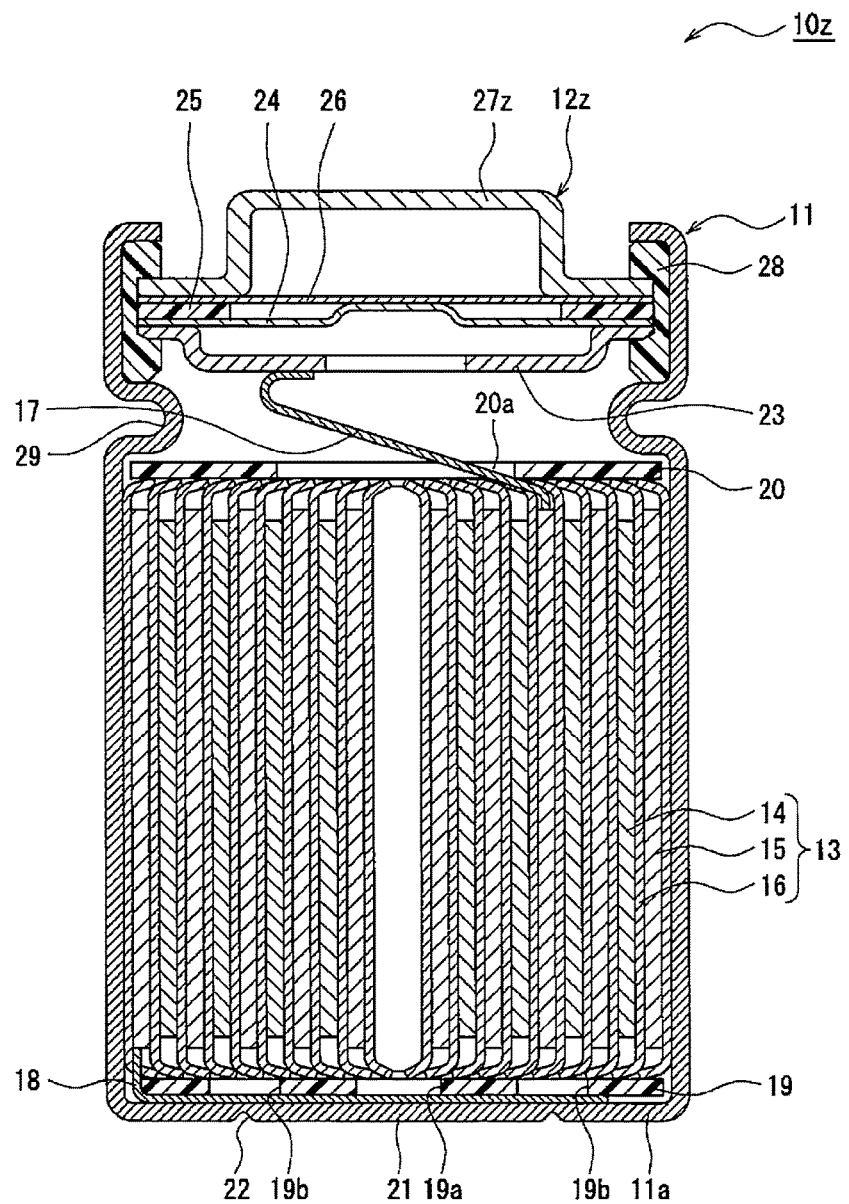
FIG. 6 is a sectional view of a battery according to still another embodiment.

Although, in the above-described embodiment, the sealing body 12 having the gas discharge mechanism is given as an example, a sealing body 12z whose cap 27 does not have a cap opening 27a and that does have a gas discharge mechanism as in a battery 10z given as an example in FIG. 6 may be used. In this case, since gas is discharged from only the gas discharge port 21 in the bottom portion 11a of the case body 11, for example, an exhaust duct (not shown) need not be disposed at the sealing body 12z.

Figure 7:
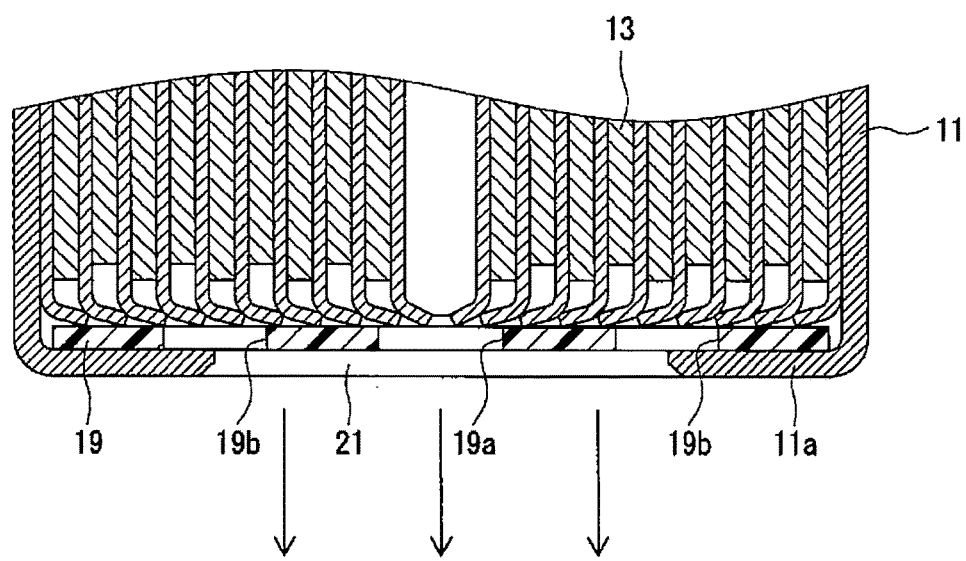
FIG. 7 illustrates a state in which gas is discharged from a gas discharge port that has been opened.

As shown in FIG. 7, according to the battery 10 having the above-described structure, when gas that is generated in the battery is discharged to the outside from the gas discharge port 21, the bottom-portion insulating plate 19 functions as a cover that holds the electrode body 13. When gas is discharged, movement of the electrode body 13 is suppressed and protrusion of the electrode body 13 is prevented without, for example, breakage and excessive deformation of the bottom-portion insulating plate 19. This makes it possible to suppress blocking of the gas discharge port 21 by the electrode body 13 and to smoothly discharge the gas.

EXAMPLES

Although the present disclosure is further described by way of examples below, the present disclosure is not limited to these examples.

Example 1

(Forming Positive Electrode)

$LiNi_{0.5}Co_{0.2}Mn_{0.3}O_2$, acetylene black, and polyvinylidene fluoride (PVdF) were mixed with a weight ratio of 95:2.5:2.5. After adding N-methyl-2-pyrrolidone (NMP) as a dispersion medium to the mixture, a mixer (PRIMIX-Corporation-made T. K. HIVIS MIX) was used to stir the resulting product and prepare a positive electrode mixture slurry. Then, the positive electrode mixture slurry was applied to an aluminum foil, which was a positive electrode current collector, and the coating film was dried, after which a rolling roller was caused to roll on the resulting product. As a result, a positive electrode including a positive electrode mixture layer having a thickness of 60 μm and a mixture density of 3.5 g/cm$^3$ and formed on both surfaces of the aluminum foil was prepared.

[Forming Negative Electrode]

Artificial graphite (average particle diameter=10 μm, BET specific surface area=3 m$^2$/g), sodium carboxymethyl cellulose (CMC-Na), and styrene-butadiene rubber (SBR) were mixed with a weight ratio of 97.5:1.0:1.5, and water was added thereto. By using a mixer (PRIMIX-Corporation-made T. K. HIVIS MIX), the resulting product was stirred to prepare a negative electrode mixture slurry. Then, the negative electrode mixture slurry was applied to a copper foil, which was a negative electrode current collector, and the coating film was dried, after which a rolling roller was caused to roll on the resulting product. As a result, a negative electrode including a negative electrode mixture layer having a thickness of 75 μm and a mixture density of 1.7 g/cm$^3$ and formed on both surfaces of the copper foil was prepared.

[Preparing Non-Aqueous Electrolytic Solution]

A non-aqueous electrolytic solution was prepared by adding $LiPF_6$ to a mixed solvent such that the concentration became 1.0 mol/L, with the mixed solvent being a solvent in which ethylene carbonate (EC) and diethyl carbonate (DEC) were mixed with a volume ratio of 3:7.

[Preparing Batteries]

A winding-type electrode body was prepared by mounting an aluminum lead on the positive electrode and a nickel lead on the negative electrode and spirally winding the positive electrode and the negative electrode through a polyethylene separator. This electrode body was accommodated in a cylindrical case body made of carbon steel subjected to nickel plating and having an outside diameter of 18.1 mm, a length of 65 mm, and a thickness of 0.13 mm, and the non-aqueous electrolytic solution was injected into the case body. Thereafter, an opening in the case body was sealed by a gasket and a sealing body in order to prepare an 18650-type battery (lithium ion rechargeable battery). The bottom portion of the case body had a carved portion (groove) having a depth of 0.2 mm. The carved portion was formed in a ring shape (perfect circular shape) so as to have a diameter of 12 mm from an outer side. A portion surrounded by the carved portion corresponded to a gas discharge port. The sealing body did not have a gas discharge mechanism.

A bottom-portion insulating plate A1 was disposed between the bottom portion of the case body and the electrode body.

The details of the bottom-portion insulating plate A1 were as follows.

Diameter: 16.8 mm,
Thickness: 0.2 mm
Material: glass-fiber reinforced phenolic resin
Young's modulus: 70 GPa Regarding the shape, number, and arrangement of through holes, see FIG. 3. A first through hole having a diameter of 5 mm was formed in the center of the bottom-portion insulating plate A1, and eight second through holes having a diameter of 3 mm were formed at equal intervals around the first through hole. The diameter of an imaginary circle β passing through the center of each second through hole was 5.5 mm.

Aperture ratio: 28%
Ratio between the area of first through hole and the area of each second through hole: 32%:68%

An upper-portion insulating plate (diameter: 16.8 mm, thickness: 0.2 mm) having a Young's modulus of 1.5 GPa and made of polypropylene was disposed between the sealing body and the electrode body. The upper-portion insulating plate had a through hole for inserting a positive electrode lead therethrough.

Example 2

A battery was formed by the same method as that used in Example 1 except that a bottom-portion insulating plate A2 was used instead of the bottom-portion insulating plate A1.

The details of the bottom-portion insulating plate A2 were as follows.

Diameter: 16.8 mm,
Thickness: 0.2 mm
Material: glass-fiber reinforced phenolic resin
Young's modulus: 70 GPa Regarding the shape, number, and arrangement of through holes, see FIG. 3. A first through hole having a diameter of 4 mm was formed in the center of the bottom-portion insulating plate A2, and six second through holes having a diameter of 3 mm were formed at equal intervals around the first through hole. The diameter of an imaginary circle β passing through the center of each second through hole was 5.5 mm.

Aperture ratio: 25%
Ratio between the area of first through hole and the area of each second through hole: 23%:77%

Example 3

A battery was formed by the same method as that used in Example 1 except that a bottom-portion insulating plate A3 was used instead of the bottom-portion insulating plate A1.

The details of the bottom-portion insulating plate A3 were as follows.

Diameter: 16.8 mm,
Thickness: 0.2 mm
Material: glass-fiber reinforced phenolic resin
Young's modulus: 70 GPa Regarding the shape, number, and arrangement of through holes, see FIG. 5. A first through hole having a diameter of 4 mm was formed in the center of the bottom-portion insulating plate A3, and four second through holes having a diameter of 2.5 mm were formed at equal intervals around the first through hole. The diameter of an imaginary circle β passing through the center of each second through hole was 5.25 mm.

Aperture ratio: 15%
Ratio between the area of first through hole and the area of each second through hole: 39%:61%

Comparative Example 1

A battery was formed by the same method as that used in Example 1 except that a bottom-portion insulating plate R1 was used instead of the bottom-portion insulating plate A1.

The details of the bottom-portion insulating plate R1 were as follows.

Diameter: 16.8 mm,
Thickness: 0.2 mm
Material: polypropylene
Young's modulus: 1.5 GPa Regarding the shape, number, and arrangement of through holes, one through hole having a diameter of 4 mm was formed in the center of the bottom-portion insulating plate R1.

Aperture ratio: 6%

Comparative Example 2

A battery was formed by the same method as that used in Example 1 except that a bottom-portion insulating plate R2 was used instead of the bottom-portion insulating plate A1.

The details of the bottom-portion insulating plate R2 were as follows.

Diameter: 16.8 mm,
Thickness: 0.2 mm
Material: glass-fiber reinforced phenolic resin
Young's modulus: 70 GPa Regarding the shape, number, and arrangement of through holes, see FIG. 3. A through hole having a diameter of 7 mm was formed in the center of the bottom-portion insulating plate R2, and six through holes having a diameter of 3.3 mm were formed at equal intervals around the through hole. The diameter of an imaginary circle β passing through the center of each second through hole was 5.55 mm.

Aperture ratio: 41%
Ratio between the area of first through hole and the area of each second through hole: 43%:57%

Regarding the batteries according to Examples 1 to 3 and Comparative Examples 1 and 2, by performing the following method, whether or not the electrode body protruded in a nail penetration test was examined. Table 1 shows the evaluation results along with the characteristics of the bottom-portion insulating plates.

[Nail Penetration Test]

A nail penetration test was performed on each battery in a fully charged state by performing the following procedures.

(1) At an environmental temperature of 25° C. and with a constant current of 1.0 C (2600 mA), charging was performed until the battery voltage became 4.2 V. Thereafter, with a constant voltage, charging was subsequently performed until an electrical current value became 0.05 C (130 mA).

(2) At a battery temperature of 65° C., an end of a round nail having a thickness of 3 mmϕ was brought into contact with a central portion of a side surface of each battery, the round nail was caused to penetrate each battery in a diametrical direction thereof at a speed of 80 mm/sec, and the penetration of the round nail into each battery was stopped when the round nail completely passed through each battery.

(3) After forming the gas discharge port in the bottom portion of each case body and discharging gas generated in each battery, it was confirmed whether or not the electrode body protruded.

TABLE 1

|  | EXAMPLE 1 | EXAMPLE 2 | EXAMPLE 3 | COMPARATIVE EXAMPLE 1 | COMPARATIVE EXAMPLE 2 |
|---|---|---|---|---|---|
| APERTURE RATIO (%) OF BOTTOM-PORTION INSULATING PLATE | 28 | 25 | 15 | 6 | 41 |
| YOUNG'S MODULUS (GPa) OF BOTTOM-PORTION INSULATING PLATE | 70 | 70 | 70 | 1.5 | 70 |
| PROTRUSION OF ELECTRODE BODY | NO | NO | NO | YES | YES |

As shown in Table 1, in the batteries according to Examples 1 to 3, the electrode body and the bottom-portion insulating plate did not protrude from the gas discharge port. In contrast, in the batteries according to Comparative Examples 1 and 2, the electrode body and the bottom-portion insulating plate considerably protruded from the gas discharge port, and the gas discharge port was blocked by the electrode body. The amount of deformation of the bottom-portion insulating plates according to the examples was considerably smaller than the amount of deformation of the bottom-portion insulating plates according to the comparative examples. That is, in the batteries according to the examples, the bottom-portion insulating plate functioned as a cover that holds the electrode body when gas is discharged, and prevented the protrusion of the electrode body.

INDUSTRIAL APPLICABILITY

The present invention is applicable to a battery.

REFERENCE SIGNS LIST 10 battery
11 case body
11a bottom portion
12 sealing body
13 electrode body
14 positive electrode
15 negative electrode
16 separator
17 positive electrode lead
18 negative electrode lead
19 bottom-portion insulating plate
19a first through hole
19b second through hole
20 upper-portion insulating plate
20a through hole
21 gas discharge port
22 groove
23 filter
24 lower valve body
25 insulating plate
26 upper valve body
27 cap
27a cap opening
28 gasket
29 support
α center of bottom-portion insulating plate
β, γ imaginary circle

The invention claimed is:

1. A battery comprising:
a bottomed cylindrical case body that accommodates an electrode body; and
a bottom-portion insulating plate that is disposed between the electrode body and a bottom portion of the case body,
wherein the bottom portion of the case body has a gas discharge port that opens when an internal pressure of the battery reaches a predetermined pressure,
wherein the bottom-portion insulating plate has a plurality of through holes,
wherein an aperture ratio, which is a ratio of an area of the through hole with respect to a total area of the insulating plate, is greater than or equal to 10% and less than or equal to 40%, and
wherein a Young's modulus of the bottom-portion insulating plate at 25° C. is 10 GPa or greater, and
wherein the plurality of the through holes include a first through hole and a plurality of second through holes, the first through hole being formed in a range including a center of the bottom-portion insulating plate, the plurality of second through holes being formed around the first through hole,
wherein a diameter of a circle, which is a circle whose radius extends from the center of the bottom-portion insulating plate to inner edges of the second through holes that are closest to the center is smaller than a diameter of the gas discharge port,
wherein a portion of the plurality of second through holes is located out of peripheral edge of the gas discharge port.

2. The battery according to claim 1, wherein the second through holes are formed at equal intervals on one concentric circle whose center is the first through hole.

3. The battery according to claim 1, wherein an area of the first through hole is greater than or equal to 10% and less than or equal to 45% of a total area of the through holes.

4. The battery according to claim 1, further comprising:
a sealing body that has a gas discharge mechanism and that covers an opening in the case body; and
an upper-portion insulating plate that is disposed between the electrode body and the sealing body,
wherein the Young's modulus of the bottom-portion insulating plate is greater than a Young's modulus of the upper-portion insulating plate.

5. The battery according to claim 4, wherein an opening area of the gas discharge port is greater than an opening area of the gas discharge mechanism of the sealing body.

* * * * *